US00RE46975E

(19) United States
(12) Reissued Patent
Hooli et al.

(10) Patent Number: US RE46,975 E
(45) Date of Reissued Patent: Jul. 31, 2018

(54) FREQUENCY HOPPING PATTERN AND ARRANGEMENT FOR SOUNDING REFERENCE SIGNAL

(71) Applicant: CELLULAR COMMUNICATIONS EQUIPMENT LLC, Plano, TX (US)

(72) Inventors: Kari Hooli, Oulu (FI); Kari Pajukoski, Oulu (FI); Esa Tiirola, Kempele (FI)

(73) Assignee: CELLULAR COMMUNICATIONS EQUIPMENT LLC, Plano, TX (US)

(21) Appl. No.: 14/857,723

(22) Filed: Sep. 17, 2015

Related U.S. Patent Documents

Reissue of:
(64) Patent No.: 8,537,876
Issued: Sep. 17, 2013
Appl. No.: 12/382,662
Filed: Mar. 20, 2009

U.S. Applications:
(60) Provisional application No. 61/064,690, filed on Mar. 20, 2008, provisional application No. 61/071,299,
(Continued)

(51) Int. Cl.
*H04B 1/00* (2006.01)
*H04L 5/00* (2006.01)
*H04B 1/7143* (2011.01)

(52) U.S. Cl.
CPC ..... *H04L 5/0048* (2013.01); *H04B 1/7143* (2013.01); *H04L 5/0012* (2013.01)

(58) Field of Classification Search
CPC .... H04B 1/7143; H04L 5/0012; H04L 5/0048
(Continued)

(56) References Cited

U.S. PATENT DOCUMENTS 8,537,876 B2 9/2013 Hooli et al.
2008/0039098 A1 2/2008 Papasakellariou et al.
(Continued)

FOREIGN PATENT DOCUMENTS

RU 2193277 C2 11/2002
RU 2219663 C2 12/2003
(Continued)

OTHER PUBLICATIONS

3GPP TSG RAN WG1 Archives—Aug. 2007, Week 2 (#49), Aug. 10, 2007, http://list.etsi.org/scripts/wa.exe?A1=ind0708b&L=3gpp_tsg_ran_wg1); 4 pp.
(Continued)

*Primary Examiner* — Ovidio Escalante
(74) *Attorney, Agent, or Firm* — Procopio, Cory, Hargreaves & Savitch LLP

(57) ABSTRACT

A method, an apparatus, and a computer program that includes forming frequency hopping position of the sounding reference signal is based on a hopping pattern. The hopping pattern of the sounding reference signal is configured to utilize a tree assignment for a frequency allocation of the sounding reference signal and to support at least one frequency band branch per layer. The hopping pattern of the sounding reference signal is also configured to provide consecutive sounding reference signals on widely separated frequency allocations.

9 Claims, 11 Drawing Sheets

300

Related U.S. Application Data filed on Apr. 21, 2008, provisional application No. 61/071,837, filed on May 20, 2008.

(58) Field of Classification Search

USPC ..... 375/133, 130, 132, 134, 135, 136, 137; 370/320, 335, 342, 441; 455/39, 41.2

See application file for complete search history.

(56) References Cited

U.S. PATENT DOCUMENTS

| | | | | |
|---|---|---|---|---|
| 2008/0298434 | A1* | 12/2008 | Nyberg et al. | 375/134 |
| 2009/0042615 | A1* | 2/2009 | Teo | H04B 7/0691 455/562.1 |
| 2009/0238241 | A1 | 9/2009 | Hooli et al. | |

FOREIGN PATENT DOCUMENTS

| | | | |
|---|---|---|---|
| RU | 2005107717 | A | 12/2006 |
| WO | WO 2007/075133 | | 7/2007 |
| WO | WO 2007/075133 | A1 | 7/2007 |
| WO | 2007139335 | A1 | 12/2007 |
| WO | WO 2007/139335 | | 12/2007 |

OTHER PUBLICATIONS

"Assignment Scheme for Sounding Reference Signals in E-UTRA Uplink", NTT DoCoMo, Fujitsu, Institute for Infocomm Research, 3GPP TSG RAN WG1 Meeting #51, Jeju, Korea, Nov. 5-9, 2007, Document No. R1-074806.

Etri; "Cyclic-Shift Hopping for Uplink Sounding Reference Signal", 3GPP TSG RAN WG1 Meeting #48, R1-070748, Feb. 12-16, 2007, pp. 1-7.

NTT DoCoMo et al.; "Assignment Scheme for Sounding Reference Signals in E-UTRA Uplink", 3GPP TSG RAN WG1 Meeting #51, R1-074806, Nov. 5-9, 2007, pp. 1-4.

Nokia Siemens Networks, Nokia; "SRS Bandwidth Selection", 3GPP TSG RAN WG1 Meeting #52, R1-080921, Feb. 11-15, 2008, pp. 1-7.

Korean Office Action corresponding to Korean Patent Application No. 10-2010-7023333, dated Apr. 18, 2012.

Official Action dated Aug. 22, 2012 issued in corresponding Japanese Patent Application No. 2011-500222, translation, 2 pgs.

NTT DoCoMo, Fujitsu, Mitsubishi Electric, NEC, Panasonic, Sharp, Necessity of Multiple Bandwidths for Sounding Reference Signals, 3GPP TSG-RAN WG1#47bis, R1-070090, URL: http://www.quintillion.co.jp/3GPP/TSG_RAN/TSG_RAN2007/TSG_RAN_WG1_RL1_1.html, Sorrento, Italy, Jan. 15-19, 2007, pp. 1-10.

* cited by examiner

WIRELESS NETWORK 100

500 Related Art

| Tree layer l | $B_l$ | $N_l$ | $n_l$ UE#1 | $n_l$ UE#2 | $n_l$ UE#3 |
|---|---|---|---|---|---|
| 0 | 12x40 | 1 | 0 | 0 | 0 |
| 1 | 12x20 | 2 | 0 | 1 | 1 |
| 2 | 12x4 | 5 | - | 0 | 2 |

700

750

800

900

FREQUENCY HOPPING PATTERN AND ARRANGEMENT FOR SOUNDING REFERENCE SIGNAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATIONS

This application *is a reissue of U.S. Pat. No. 8,537,876, which was filed Mar. 20, 2009, and was assigned U.S. application Ser. No. 12/382,662; which* claims priority to U.S. Provisional Patent Application No. 61/064,690, filed on Mar. 20, 2008, U.S. Provisional Patent Application No. 61/071,299, filed on Apr. 21, 2008, and U.S. Provisional Patent Application No. 61/071,837, filed on May 20, 2008. The disclosures of the prior applications are hereby incorporated by reference in their entirety.

FIELD

Some embodiments generally relate to communications, especially wireless communications. In particular, some of the embodiments relate to an uplink (UL) transmission of the universal mobile telecommunications system (UMTS) terrestrial radio access network (UTRAN) long term evolution (LTE). More specifically, certain embodiments relate to sounding reference signal (SRS) transmission and configuration.

BACKGROUND

Wireless communication networks are well known and constantly evolving. For example, UMTS is one of third-generation (3G) cell phone technologies. Currently, the most common form of UMTS uses wideband code division multiple access (W-CDMA) as the underlying air interface, as standardized by the 3GPP (3G partnership project).

Currently, UMTS networks worldwide are being upgraded to increase data rate and capacity for downlink packet data. In order to ensure a further competitiveness of UMTS, various concepts for UMTS long term evolution (LTE) have been investigated to achieve a high-data-rate, low-latency and packet optimized radio access technology.

3GPP LTE (long term evolution) is the name given to a project within the third generation partnership project to improve the UMTS mobile phone standard to cope with future requirements. Goals of the project include improving efficiency, lowering costs, improving services, making use of new spectrum opportunities, and better integration with other open standards. The LTE project is not a standard, but it is expected to result in the new evolved release 8 of the UMTS standard, including mostly or wholly extensions and modifications of the UMTS system.

A characteristic of evolved UMTS is that it is fundamentally based upon transmission control protocol/internet protocol (TCP/IP), the core protocol of the Internet, with built-on higher level services such as voice, video, and messaging.

In modern wireless networks, a sounding reference signal (SRS) is typically transmitted with a wide bandwidth for a base station, or node B, to find a best resource unit (RU), also known as a resource block (RB) or physical resource block (PRB) in the LTE standard for a transmitting from a user equipment (UE), such as a mobile device. However, due to the restrictions on the maximum UE transmission power, the channel quality indication (CQI) measurement accuracy is degraded when the received power of the SRS signal is degraded, such as when a UE located near edge of the cell transmits the SRS. This degradation of the SRS may cause errors to arise in the optimum RU assignment and in the modulation and coding scheme (MCS) selection. Therefore, improvements in the transmission of the SRS from the UE help to achieve the maximum user throughput. Accordingly, the SRS is designed to enable channel aware scheduling and fast link adaptation for PUSCH for UL data transmissions. The SRS is also used as a reference (RS) for closed loop power control (PC) for both physical uplink shared channel (PUSCH) and a physical uplink control channel (PUCCH).

Furthermore, SRS can be used to improve/enable the channel aware download (DL) scheduling in time division duplex (TDD) mode. TDD is the application of time-division multiplexing to separate outward and return signals. In particular, TDD emulates full duplex communication over a half duplex communication link and provides benefits where the asymmetry of the uplink and downlink data speed is variable.

SUMMARY

The present invention has been developed in response to the present state of the art, and in particular, in response to the problems and needs in the art that have not yet been fully solved by currently available communication system technologies. Accordingly, the present invention has been developed to provide a sounding reference signal frequency hopping pattern apparatus, method, and a computer program embodied on a computer-readable medium.

According to one embodiment, a method may be provided to include forming, by a processor, a frequency hopping position of the sounding reference signal based on a hopping pattern. The method may also include configuring the hopping pattern of the sounding reference signal to utilize a tree assignment for a frequency allocation of the sounding reference signal and to support at least one frequency band branch per layer. The method may include configuring the hopping pattern of the sounding reference signal to provide consecutive sounding reference signals on widely separated frequency allocations.

According to another embodiment, an apparatus may be provided to include a processor configured to process frequency hopping position of the sounding reference signal based on a hopping pattern. The hopping pattern of the sounding reference signal may be configured to utilize a tree assignment for a frequency allocation of the sounding reference signal and to support at least one frequency band branch per layer, and to provide consecutive sounding reference signals on widely separated frequency allocations.

According to another embodiment, computer program may be provided to be embodied on a computer-readable medium. The computer program may be configured to control a processor to perform a method. The computer program includes forming a frequency hopping position of the sounding reference signal based on a hopping pattern. The computer program may also include configuring the hopping pattern of the sounding reference signal to utilize a tree assignment for a frequency allocation of the sounding reference signal and to support at least frequency band branch per layer. The computer program may also include configuring the hopping pattern of the sounding reference signal to provide consecutive sounding reference signals on widely separated frequency allocations.

In accordance with another embodiment, an apparatus may be provided to include a forming means for forming a frequency hopping position of the sounding reference signal based on a hopping pattern. The apparatus may also include a configuring means for configuring the hopping pattern of the sounding reference signal to utilize a tree assignment for a frequency allocation of the sounding reference signal, to support at least one frequency band branch per layer, and to provide consecutive sounding reference signals on widely separated frequency allocations.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS

Figure 1:
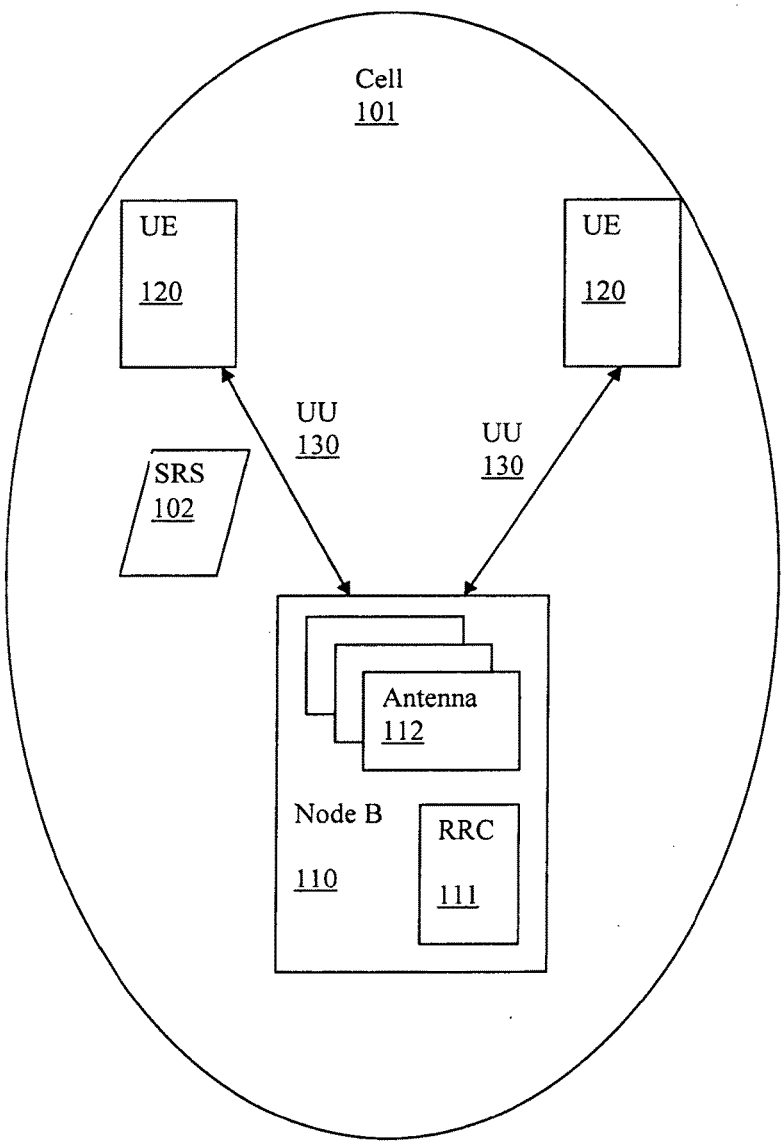
FIG. 1 is a high level schematic diagram of a UMTS system.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in the attached figures, is not intended to limit the scope of the invention, as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

In addition, while the terms, data, packet, and/or datagram have been used in the description of the present invention, the invention has import to many types of network data. For purposes of this invention, the term data includes packet, cell, frame, datagram, bridge protocol data unit packet, packet data and any equivalents thereof.

The following list of certain abbreviations is used in the current specification:

| | |
|---|---|
| BTS | Base Transceiver Station |
| BW | Bandwidth |
| DM | Demodulation |
| LTE | Long Term Evolution |
| PUCCH | Physical Uplink Control Channel |
| PUSCH | Physical Uplink Shared Channel |
| RB | Resource Block (180 kHz, 12 subcarriers) |
| RPF | Repetition factor |
| RRC | Radio Resource Control |
| RS | Reference Signal |
| SRS | Sounding Reference Signal |
| TDD | Time Division Duplexing |
| UE | User Equipment |
| UTRAN | Universal Terrestrial Radio Access Network |
| WMCDA | Wideband Code Division Multiple Access |

In the current LTE, SRS signaling is controlled by a node B 110 and SRS parameters are configured per UE 120. For example, aspects of the SRS are semi-statically configurable per UE 120, for example as part of a radio resource control (RRC) signaling. In particular, the UE 120 may specify various attributes as part of an uplink communications to the node B 110. In addition, when the SRS is changed, the bandwidth (BW) used by a UE 120 may be adjusted by transmitting a configuration for a given operating bandwidth. When adjusting the bandwidth, the SRS transmission ideally should not puncture the PUCCH region, or PUSCH region containing persistent resource allocations.

The UE 120 may also adjust the duration of the SRS transmissions based on the RRC signaling made by node B 110. For example, the SRS transmissions may be defined as being either "one shot" transmissions or an indefinite periodic transmissions that are valid until otherwise disabled or until the session ends. The UE 120 may further adjust the period for the SRS transmissions. For example, the period may be 2, 5, 10, 20, 40, 80, 160 or 320 ms. The SRS is typically defined to include a repetition factor (RPF) of 2. The UE 120 may further adjust the SRS to include a cyclic shift signaled with 3 bits, as described in greater detail below.

Frequency hopping SRS may be a beneficial arrangement for sounding a large bandwidth with limited SRS overhead, although at a cost of delaying channel quality information (CQI) measurement.

To provide an efficient assignment of SRSs with different transmission bandwidths, one scheme presents a bandwidth assignment based on a tree structure resembling orthogonal variable spreading factor (OVSF) code assignment with a tree structure. In other words, there is always exactly two branches on each layer. Although the present discussion refers to OVSF code tree, it should be appreciated that other tree-based assignments exist and may used in the alternative.

Figure 5:
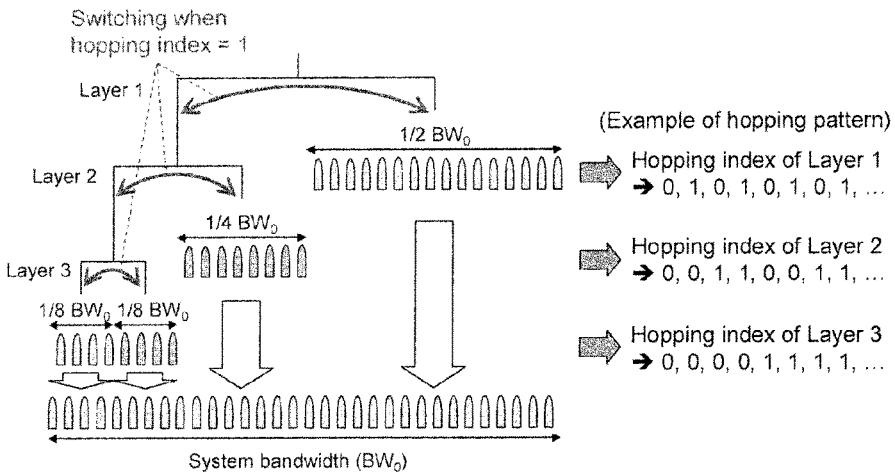
FIG. 5 illustrates a tree based SRS frequency hopping.

For example, referring to FIG. 5, an exemplary scheme for frequency hopping for SRSs with different bandwidths may be based on OVSF code tree structure. In FIG. 5, a branch of the OVSF code tree 500 is switched based on a pre-determined pattern. Hence, by using the hopping method, efficient frequency hopping of SRSs with different bandwidths can be achieved while maintaining the OVSF code tree based SRS assignment.

OVSF and other tree-based SRS assignment may support both hopping-based and localized-based multiplexing for SRSs with a narrower transmission bandwidth than the system bandwidth in order to maximize the user throughput performance in various cell deployment scenarios. Moreover, the scheme of FIG. 5 may be adapted to achieve an efficient SRS hopping method based on the switching of branches of the OVSF code tree. However, the other scheme does not take into account the current SRS assumptions made in 3GPP. For example, the scheme may not work properly if the SRS transmission punctures either the PUCCH region or persistent PUSCH. Also, OVSF code tree with two branches per layer may not work if certain BW options are allowed for SRS. OVSF code tree, therefore, lacks a concrete SRS frequency hopping arrangement that functions within the current 3GPP specifications for the LTE.

Various schemes for SRS bandwidths are known. For example, co-owned provisional application Nos. 60/006,634 filed on Jan. 8, 2008 and 60/006,901 filed on Feb. 5, 2008, the subject matter of which is hereby incorporated by reference in full. These and other known schemes for SRS bandwidths do not disclose any SRS frequency hopping patterns.

FIG. 1 illustrates a UMTS system 100 in accordance with some embodiments. In particular, the UMTS system 100 may include one or more node B 110 (known in the LTE as enhanced node B or eNB) that define one or more cells 101, and multiple user equipments (UE) 120 associated with one or more of the cells. The radio interface between the UE and the Node-B is called Uu 130.

The node B 110, also known as a BTS (base transceiver station) in GSM, may use wideband code division multiple access (WCDMA) as air transport technology. The node B 110 include radio frequency transmitter(s) and the receiver(s) to communicate directly with the mobile stations (e.g. UE 120), which move freely around it. In this type of cellular networks, the UE 120 may not communicate directly with each other but may have to communicate with the nodes B 110.

Traditionally, the node Bs 110 have minimum functionality, and are controlled by an RNC (radio network controller) 111. However, this is changing with the emergence of high speed downlink packet access (HSDPA), where some logic (e.g. retransmission) is handled on the node B 110 for lower response times.

The utilization of WCDMA technology may allow cells belonging to the same or different node Bs 110 and even controlled by different RNC to overlap and still use the same frequency. in fact, the whole network can be implemented with just one frequency pair to achieve soft handovers between the cells.

Since WCDMA often operates at higher frequencies than global system mobile communications (GSM), the cell range is considerably smaller compared to GSM cells. Unlike in GSM, the size of the cells may not be constant, in a phenomenon known as cell breathing. This configuration may require a larger number of Node-Bs 110 and careful planning in 3G (UMTS) networks. However, the power requirements on the node Bs 110 and the UE 120 (user equipment) are usually much lower.

The node B 110 typically includes an antenna (not depicted) connected to several components, including power amplifiers and digital signal processors (also not depicted). The node B 110 can serve several cells 101, also called sectors, depending on the configuration and type of antenna.

Continuing with FIG. 1, the UE 120 roughly corresponds to the mobile station in GSM systems and may be any device used directly by an end user to communicate. For example, the UE 120 may be a hand-held telephone, a card in a laptop computer, or other device. The UE 120 connects to the base station, the above-described node B 110. It roughly corresponds to the mobile station in GSM systems.

Furthermore, the UE 120 transmits and receives several messages to and from the node 110 B. One of the messages being transmitted includes an SRS 102. The SRS 102 may be configured based on data received from the node B 110 or by a user interface or both. As a result, the message including the configured SRS 102 can be transmitted to the node Bs 110 from the UEs 120.

The UE 120 may handle the tasks toward the core network, including: mobility management, call control, session management, and identity management. Generally, the corresponding protocols are transmitted transparently via a node B 110, such that the node B 110 does not change, use or understand the protocol information. The UMTS backend becomes accessible via a variety of means, such as a GSM/UMTS radio network (GSM EDGE radio access network (GERAN), UMTS terrestrial radio access network (UTRAN), and evolved universal terrestrial radio access network (E-UTRAN)), WiFi, ultra mobile broadcast (UMB) and worldwide interoperability microwave access (WiMAX). Users of non-UMTS radio networks may be provided with an entry-point into the IP network, with different levels of security depending on the trustworthiness of the network being used to make the connection. Users of GSM/UMTS networks may use an integrated system where all authentication at every level of the system is covered by a single system, while users accessing the UMTS network via WiMAX and other similar technologies would handle the WiMAX connection one way, for example, authenticating themselves via a media access control (MAC) address or electronic serial number (ESN) address, and the UMTS link-up another way.

In LTE Release 8, an air interface called the evolved universal terrestrial radio access (E-UTRA) may be used by UMTS operators deploying wireless networks. The current E-UTRA systems use OFDMA for the downlink (tower to handset) and single carrier frequency division multiple access (SC-FDMA) for the uplink and employs multiple-input/multiple-output (MIMO) with up to four antennas per station. The channel coding scheme for transport blocks is turbo coding and a contention-free quadratic permutation polynomial (QPP) turbo code internal interleaver.

The use of OFDM, a system where the available spectrum may be divided into thousands of very thin carriers, each on a different frequency, each carrying a part of the signal, enables E-UTRA to be much more flexible in its use of spectrum than the older CDMA based systems used in the 3G protocols. CDMA networks may require large blocks of spectrum to be allocated to each carrier, to maintain high chip rates, and thus maximize efficiency. OFDM has a link spectral efficiency that is greater than CDMA, and when combined with modulation formats such as 64 QAM and techniques as MIMO, E-UTRA is typically more efficient than W-CDMA with HSDPA and HSUPA.

In the LTE, release 8, the subcarrier spacing in the OFDM downlink is 15 kHz and there is a maximum of 2048 subcarriers available. Mobile devices may be capable of receiving all 2048 subcarriers but a base station typically supports transmitting only 72 subcarriers, in the minimum configuration. The number of subcarriers in DL depends on the channel BW, and the 2048 subcarriers can be achieved with a 20 MHZ BW. The exact number of subcarriers scales down with the BW. The transmission is divided in time into time slots of duration 0.5 ms and subframes of duration 1.0 ms. A radio frame is 10 ms long. Supported modulation formats on the downlink data channels are quadrature phase-shift keying (QPSK), 16 quadrature amplitude modulation (QAM), and 64 QAM.

Continuing with the current specification for the uplink, multiplexing SC-FDMA may be used, and QPSK or 16 QAM (64 QAM optional) modulation. SC-FDMA is used because it has a low peak-to-average power ratio (PAPR). Each mobile device has at least one transmitter. Through virtual MIMO/spatial division multiple access (SDMA), system capacity in the uplink direction can be increased depending on the number of antennas at the base station.

In particular, LTE uplink transmission scheme uses SC-FDMA. While OFDMA is seen optimum to fulfill the LTE requirements in downlink, OFDMA properties are less favorable for the uplink. This is mainly due to weaker peak-to-average power ratio (PAPR) properties of an OFDMA signal, resulting in worse uplink coverage. Thus, the LTE uplink transmission scheme for FDD and TDD mode is based on SC-FDMA with cyclic prefix. SC-FDMA signals have better PAPR properties compared to an OFDMA signal, and the PAPR characteristics are important for cost-effective design of UE power amplifiers. Still, SC-FDMA signal processing has some similarities with OFDMA signal processing, so parameterization of downlink and uplink can be harmonized.

There are different possibilities how to generate an SC-FDMA signal. For example, discrete fourier transform-spread-orthogonal frequency division multiplexing (DFT-s-OFDM) has been selected for E-UTRA. For DFT-s-OFDM, a size-M DFT may be first applied to a block of M modulation symbols. Then, QPSK, 16 QAM and 64 QAM may be used as uplink E-UTRA modulation schemes, the latter being optional for the UE. The DFT may transform the modulation symbols into the frequency domain. The result may be mapped onto the available sub-carriers. In E-UTRA uplink, only localized transmission on consecutive sub-carriers may be allowed. An N point inverse fast fourier transform (IFFT) where N>M is then performed as in OFDM, followed by addition of the cyclic prefix and parallel to serial conversion.

The DFT processing is, therefore, a fundamental difference between SCFDMA and OFDMA signal generation, as indicated by the term DFT-spread-OFDM. In a SC-FDMA signal, each sub-carrier used for transmission contains information of all transmitted modulation symbols, since the input data stream has been spread by the DFT transform over the available sub-carriers. In contrast to this, each sub-carrier of an OFDMA signal only carries information related to specific modulation symbols.

Similarly, in SC-FDMA parameterization, the E-UTRA uplink structure can be similar to the downlink. For example, an uplink radio frame may consist of 20 slots of 0.5 ms each, and 1 subframe consists of 2 slots. In uplink, data is allocated in multiples of one resource block. Uplink resource block size in the frequency domain is currently 12 sub-carriers, the same as in downlink However, not all integer multiples are usually allowed in order to simplify the DFT design in uplink signal processing, and typically, only factors 2, 3, and 5 are allowed. These restrictions are cited as examples. Similarly, the uplink transmission time interval is 1 ms (same as downlink).

User data can be carried on the physical uplink shared channel (PUSCH) that may be determined by the transmission bandwidth and the possible frequency hopping pattern. The physical uplink control channel (PUCCH) can carry uplink control information in the absence of UL data, e.g., CQI reports and ACK/NACK information related to data packets received in the downlink (in the presence of UL data, control signals can be transmitted on PUSCH time multiplexed with UL data). The PUCCH can be transmitted on a reserved frequency region in the uplink.

In the uplink reference signal structure, uplink reference signals may be used for channel estimation in the node B 110 receiver in order to demodulate control and data channels. On the other hand, the reference signals may provide channel quality information (CQI) as a basis for scheduling decisions in the base station, also called channel sounding. The uplink reference signals can be based on CAZAC (constant amplitude zero auto correlation) sequences or computer search based ZAC (zero auto correlation) sequences.

For uplink physical layer procedures with E-UTRA, the uplink physical layer procedures may be needed. For example, with non-synchronized random access, the random access may be used to request initial access, as part of handover, when transiting from idle to connected, or to reestablish uplink synchronization. Similarly, if multiple random access channels can be defined in the frequency domain within one access period in order to provide a sufficient number of random access opportunities.

The random access procedure can use open loop power control with power ramping similar to WCDMA. After sending the preamble on a selected random access channel, the UE waits for the random access response message. If no response is detected then another random access channel is selected and a preamble is sent again.

For uplink scheduling, the scheduling of uplink resources can be done by node B 110. The node B 110 can assign certain time/frequency resources to the UEs 120 and informs UEs 120 about which transmission formats to use. Scheduling decisions affecting the uplink can be communicated to the UEs 120 via the PDCCH in the downlink The scheduling decisions may be based on quality of service (QoS) parameters, UE buffer status, uplink channel quality measurements, UE capabilities, UE measurement gaps, etc.

As uplink link adaptation methods, transmission power control, adaptive modulation and channel coding rate, as well as adaptive transmission bandwidth can be used. Similarly, uplink timing control may be needed to time align the transmissions from different UEs 120 with the receiver window of the node B 110. The node B 110 sends the appropriate timing-control commands to the UEs 120 in the downlink, commanding the UEs 120 to adapt respective transmit timing. For hybrid automatic repeat request (HARQ), the node B 120 may request retransmissions of incorrectly received data packets.

The 3.9-generation mobile telephone technology provides a digital mobile phone system that is based on 3G but with expanded capabilities close to the expectations of 4G. Feasibility and standardization are being studied with the objective of achieving a smooth transitional link between the current 3G and future 4G.

Figure 3:
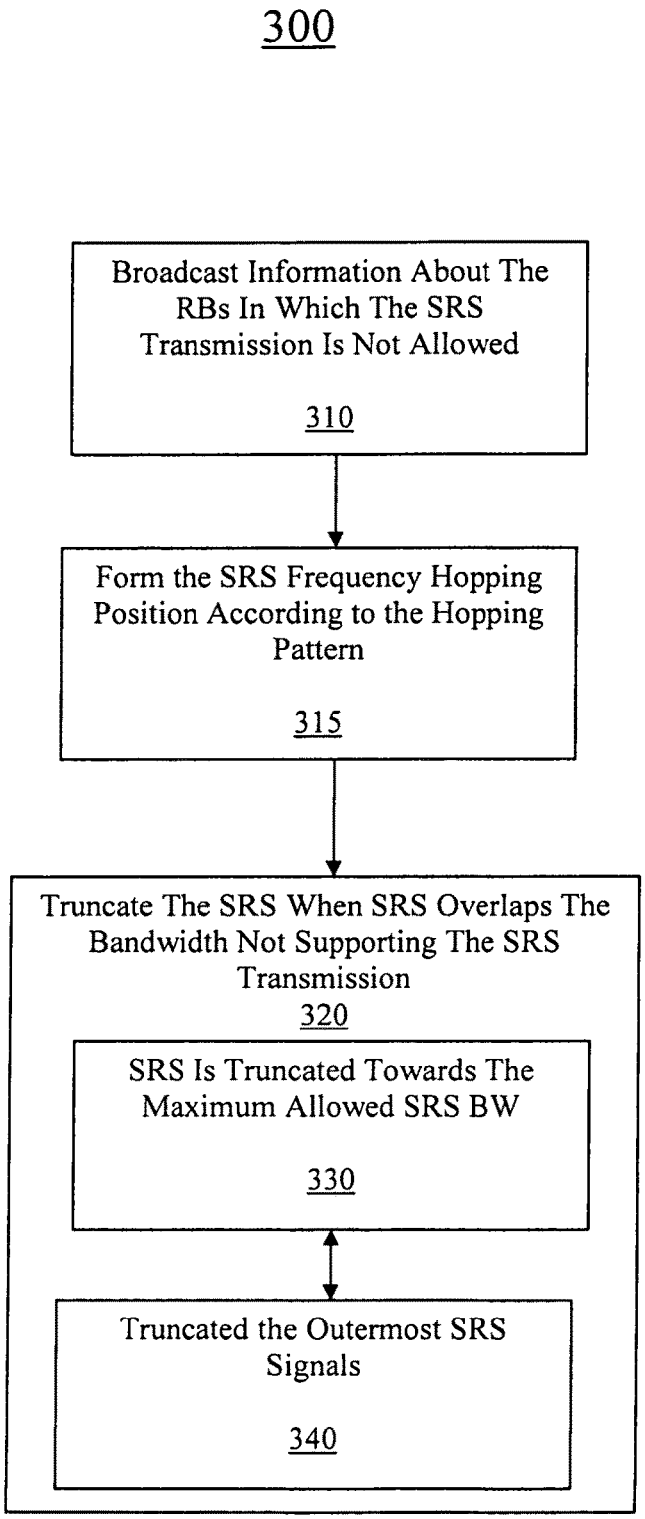
FIG. 3 illustrates steps in a sounding reference signal frequency hopping pattern and arrangement method in accordance with at least one embodiment.

FIG. 3 illustrates a method 300 for sounding reference signal frequency hopping pattern and arrangement. In step 310, information about the RBs in which the SRS transmission may not be allowed (i.e., PUCCH region or PUCCH-resource-size) is broadcasted. Then, in step 315, the SRS frequency hopping position may be formed according to a hopping pattern, and in step 320, the SRS may be truncated in the case when SRS overlaps the bandwidth not supporting the SRS transmission. As described below, the UE 120 may perform the truncation autonomously without additional UE 120 specific signalling. In particular, the SRS may be truncated towards the maximum allowed SRS BW in step 330. Continuing with method 300, the outermost SRS signals may be truncated in step 340 so that the truncation impacts neither one of the configured SRS BW nor the applied tree based SRS frequency band assignment.

Figure 6:
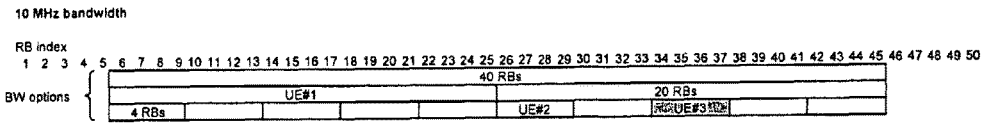
FIG. 6 illustrates an exemplary SRS frequency position configuration with tree structure in accordance with at least one embodiment.

FIG. 6 illustrates an exemplary SRS frequency position configuration 600 with tree structure. In particular, the frequency-domain starting position of (non-frequency hopping) SRS, $k_0$, may be given in sub-carries and may be defined by $$k_0 = k'_0 + \sum_{l=0}^{L_{SRS}} B_l n_l \quad \text{(Eq. 1)}$$

where $k'_0$ is an offset (in sub-carriers) related, e.g., to the PUCCH region and the used RPF comb, $L_{SRS}$ is the assignment tree layer depth in the SRS position assignment, corresponding to the assigned SRS bandwidth, ($L_{SRS}$ can also be seen as the number of the assigned SRS bandwidth value) $B_l$ is the SRS bandwidth (in subcarriers) on tree layer l (i.e. $B_l$=RPF×the length of the SRS sequence on layer l) and $n_l$ is the SRS frequency position assignment index on tree layer l.

Figure 7A:
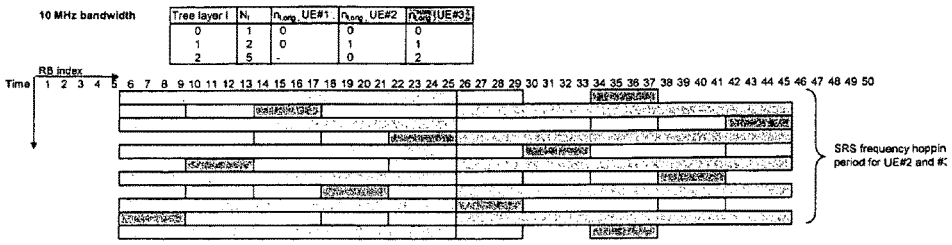
FIG. 7A illustrates an exemplary SRS frequency hopping pattern in accordance with at least one embodiment.

FIG. 7A illustrates an exemplary SRS frequency hopping pattern 700 utilizes a tree assignment for SRS frequency allocation and supports multiple frequency band branches per layer. The SRS frequency hopping pattern 700 further provides consecutive SRS signals on widely separated frequency allocations, thus, maximizing frequency diversity in consecutive channel quality indicator (CQI) measurements. Moreover, as described below, the SRS frequency hopping pattern 700 further prevents frequency hopping SRS from puncturing the PUCCH and the persistent PUSCH regions.

As described above, the LTE standards indicate that that the SRS should not puncture PUCCH region. The condition may also be true for the PUSCH region of persistent allocations. These condition should be preserved when the PUCCH and/or the persistent PUSCH regions dynamically varies. To better ensure this desired outcome, some of the embodiments define SRS frequency hopping pattern depending on the handling of the dynamic PUCCH region. For example, at a change of PUCCH region, the SRS transmissions impacted may be reconfigured.

Information on current PUCCH RBs (or more exactly, on RBs not allowed for SRS transmission) is broadcasted and UEs will modify their SRS transmissions as illustrated in FIG. 3. The drawback is that occasionally when a narrow SRS transmission hops into PUCCH region, it is dropped. In other words, there may be instances in the hopping pattern when SRS may be not transmitted.

However, the frequency-domain starting position for hopping SRS can be defined with the same equation as for the SRS without frequency hopping. Then, the proposed frequency hopping pattern can be defined in terms of $n_l$ for tree layers 1 and above:

$$n_l = F_{l,t} + n_{l,orig} \bmod N_l \quad \text{(Eq. 2)}$$

where:

$n_{l,orig}$ is the reference value of allocation index for tree layer l. In other words, it gives the allocation index value for a common reference frame & subframe number+subframe offset from dedicated RRC signaling, $$F_{l,t} = N_l/2\left\lfloor \frac{t \bmod \prod_{l'=0}^{l} N_{l'}}{\prod_{l'=0}^{l-1} N_{l'}} \right\rfloor + \left\lfloor \frac{t \bmod \prod_{l'=0}^{l} N_{l'}}{2\prod_{l'=0}^{l-1} N_{l'}} \right\rfloor \quad \text{(Eq. 3)}$$

if $N_l$ even;

$$F_{l,t} = \lfloor N_l/2 \rfloor \left\lfloor t \Big/ \prod_{l'=0}^{l-1} N_{l'} \right\rfloor \quad \text{(Eq. 4)}$$

if $N_l$ odd where $N_l$ is the number new branches per a branch on the assignment tree layer l. For example, on an OVSF code tree, $N_l$=2.

t is the time index for the SRS, and is relative on common reference frame & subframe number and it is function of current frame number, subframe number, SRS subframe offset and SRS period. Essentially it is a running index of SRS occurrences relative to a common time reference, obtaining values {0, 1, 2, . . . }. For example, t may be given, e.g, as t=[10×(frame number−reference frame number)+subframe number−reference subframe number−subframe offset]/SRS period.

In one embodiment, $F_{l,t}$ can be simplified as indicated below:

$$F_{l,t} = N_l/2\left\lfloor \frac{t \bmod 2^{l-1} N_l}{2^{l-1}} \right\rfloor + \left\lfloor \frac{t \bmod 2^{l-1} N_l}{2^{l}} \right\rfloor \quad \text{(Eq. 5)}$$

if $N_l$ even $$F_{l,t} = \lfloor N_l/2 \rfloor \lfloor t/2^{l-1} \rfloor \quad \text{(Eq. 6)}$$

if $N_l$ odd

Figure 8:
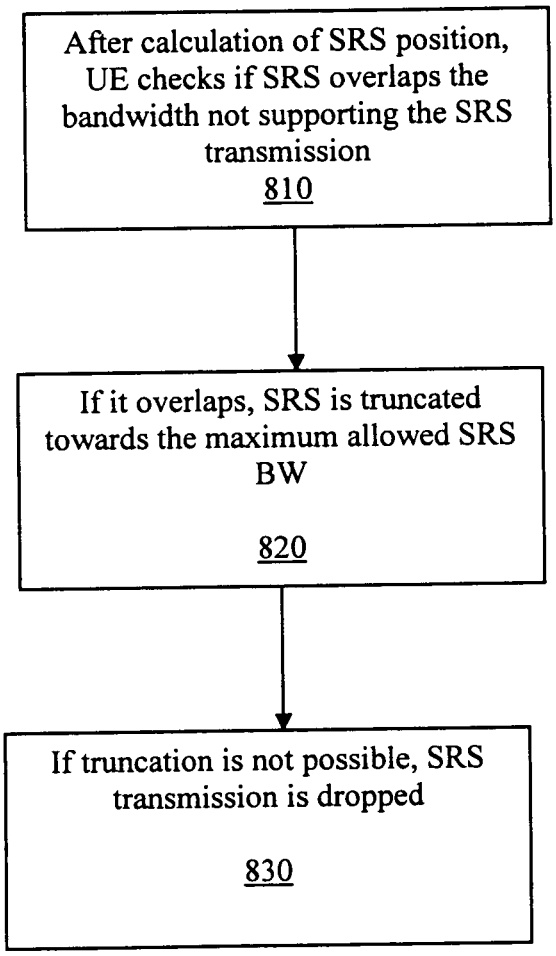
FIG. 8 illustrates steps in a method for forming a hopping SRS in accordance with at least one embodiment.

FIG. 8 illustrates a method 800 for forming a hopping SRS. After calculation of SRS position, UE 120 checks if SRS overlaps the bandwidth not supporting the SRS transmission (i.e., current PUCCH region broadcasted by eNB) in step 810. Typically, UE 120 may perform the truncation autonomously without additional UE 120 specific signalling. The length of the SRS hopping pattern is given by number of branches on the tree layer corresponding to the allocated SRS bandwidth as given below in equation 7.

$$\Pi_{l=0}^{L_{SRS}} N_l. \quad \text{(Eq. 7)}$$

Alternatively, frequency hopping may be applied only to some tree layers. As an example, frequency hopping may be applied to tree layers $l_{min}$ and but may not be applied to tree layers from 0 to $l_{min}-1$. As a result, the proposed frequency hopping pattern can be defined by (Eq. 1) where:

$$F_{l,t}=0 \quad \text{(Eq. 8)}$$

if $l<l_{min}$;

If l is equal to or larger than $l_{min}$, $$F_{l,t} = N_l/2\left\lfloor \frac{t \bmod \prod_{l'=l_{min}-1}^{l} N_{l'}}{\prod_{l'=l_{min}-1}^{l-1} N_{l'}} \right\rfloor + \left\lfloor \frac{t \bmod \prod_{l'=l_{min}-1}^{l} N_{l'}}{2\prod_{l'=l_{min}-1}^{l-1} N_{l'}} \right\rfloor \quad \text{(Eq. 9)}$$

$$F_{l,t} = \lfloor N_l/2 \rfloor \left\lfloor t \Big/ \prod_{l'=l_{min}-1}^{l-1} N_{l'} \right\rfloor \quad \text{(Eq. 10)}$$

if $N_l$ odd.

Differing from previous notation, $N_{l_{min}-1}=1$ in (Eq. 9) and (Eq. 10) regardless of the number of new branches on tree layer $l_{min}-1$.

Figure 7B:
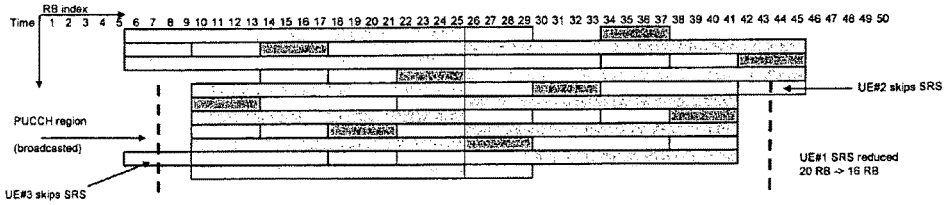
FIG. 7B illustrates an exemplary SRS arrangements with dynamically changing PUCCH region in accordance with at least one embodiment.

Continuing with FIG. 8, if the SRS overlaps, SRS may be truncated towards the maximum allowed SRS BW in step 820. For example, FIG. 7B illustrates an exemplary SRS arrangement 750 with dynamically changing PUCCH region, in which the SRS has been truncated to adjust for the PUCCH region. If truncation is not possible, SRS transmission is dropped in step 830.

Alternatively, eNB 110 may facilitate for PUCCH region changes by broadcasting the SRS tree structure parameters (e.g. number of layers, $N_l$, and associated SRS bandwidths). When PUCCH region or, alternatively, allowed SRS region changes, the broadcasted SRS tree structure parameters are changed. In another embodiment, at the change of broadcasted SRS tree structure parameters, the existing SRS allocations are autonomously mapped in UE 120 and eNB 110 onto allocations on the current SRS tree according to predefined allocation re-mapping rules. The number of SRS allocations may be reduced in the SRS tree reconfiguration. In that case, certain UEs 120 identified by the predefined allocation re-mapping rules will autonomously stop their SRS transmissions until they receive new UE 120 specific SRS configuration via higher layer signaling. The hopping pattern is always defined according the currently broadcasted SRS tree and, thus, covering the whole SRS region currently allowed. This embodiment allows for reconfiguration of SRS tree with minimal UE 120 specific signaling. It should be appreciated that the presented SRS allocation re-mapping can be applied for SRS allocations with and without frequency hopping.

As a result, the hopping SRS forming method 800 illustrated in FIG. 8 may utilize a tree assignment for SRS frequency allocation and may support multiple frequency band branches per tree layer. Also, the hopping SRS forming method 800 illustrated in FIG. 8 provides consecutive SRS signals on widely separated frequency allocations, thus, maximizing frequency diversity in consecutive CQI measurements. Furthermore, the hopping SRS forming method 800 illustrated in FIG. 8 may prevent frequency hopping SRS from puncturing the PUCCH (persistent PUSCH) region. The hopping SRS forming method 800 illustrated in FIG. 8 may further allow minimization of the signalling burden related to frequency hopping SRS: frequency hopping can be made cell-specific parameter which only requires one bit from the system information block (SIB) message.

It should be appreciated that the SRS may be scheduled with or without frequency hopping. For example, referring to FIG. 1, the selection between frequency hopping and non-hopping SRS may be specific to a cell 101 and is then broadcasted to all of the UEs 120 within the cell 101. Alternatively, the hopping/non-hopping selection may be specific to each UE 120, and may be configured with dedicated radio resource controller (RRC) 111. The separation of frequency hopping and non-hopping SRS is then implemented at the node B 110 (or enhanced node B, eNB). For example, the hopping and non-hopping SRS can be separated with a repetition factor (RPF) comb or with subframe offsets.

Figure 9:
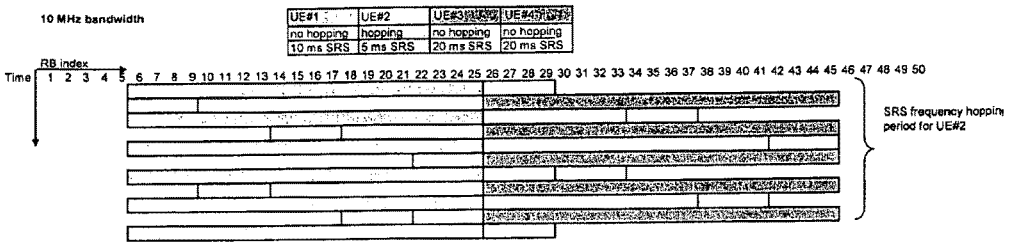
FIG. 9 illustrates an exemplary SRS that has been scheduled with frequency hopping for a second UE and without frequency hopping for other depicted UEs in accordance with at least one embodiment.

For example, as illustrated in FIG. 9, an exemplary transmission block 900 includes frequency hopping SRS and non-hopping SRS that are multiplexed into same SRS symbol (or SC-FDMA symbol) when the period of non-hopping SRS is longer than the one of hopping SRS.

With frequency hopping SRS, multiple SRS periods may potentially cause additional restrictions on the SRS configurations. Typically, all frequency hopping SRS preferably have the same period on each particular SRS symbol and comb combination. For example, 2 ms and 5 ms periods can be used simultaneously for frequency hopping SRS in a cell if they are allocated on different combs.

Similarly, configuration of a one shot SRS is relatively straightforward by adapting previous techniques, whereby the SRS can be configured either with or without frequency hopping.

Referring again to FIG. 1, a cell may include multiple antennas 112 to provide antenna diversity. Transmission antenna diversity can be a closed loop transmission, wherein up-link channel information is fed back from a mobile station. With closed loop antenna selection, the transmitting antennas typically alternate between consecutive SRS transmissions. Similarly, the transmitting antennas would also typically alternate in the case of frequency hopping SRS. However, in order to transmit the same frequency from both antennas, consecutive SRSs are preferably transmitted from the same antenna only once in the same frequency hopping period. For example, the first SRS of the hopping period may be transmitted from the same antenna as the last SRS of the hopping period.

Figure 4:
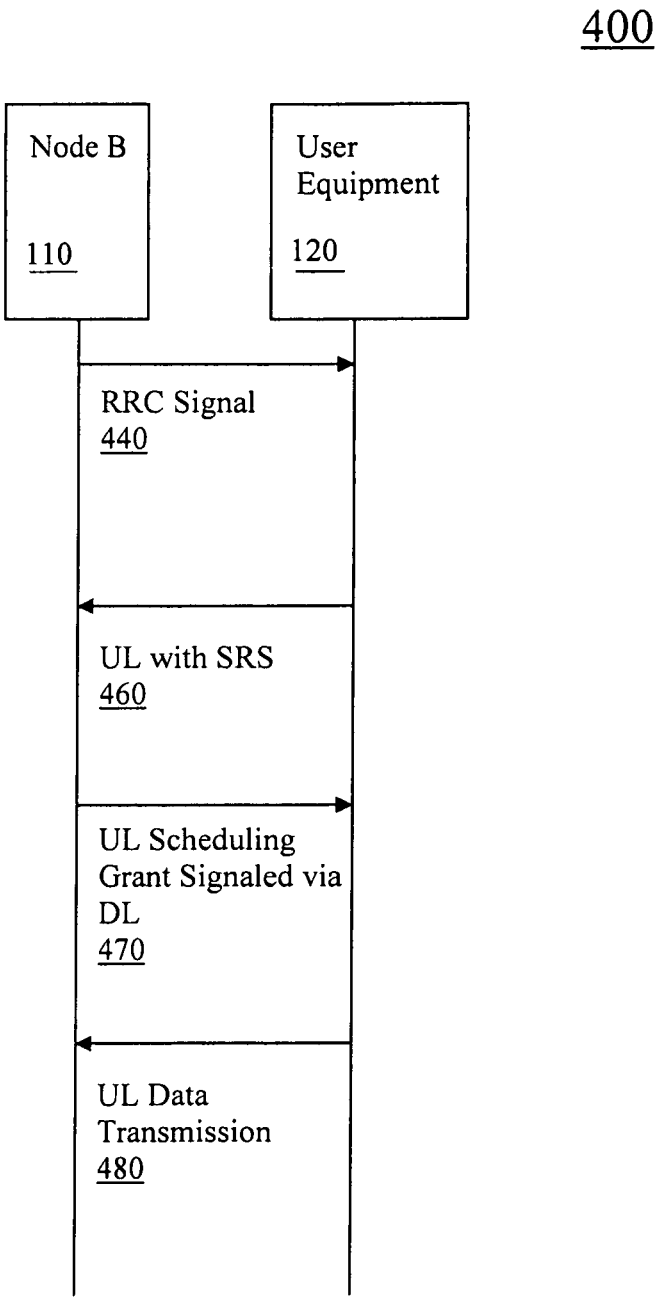
FIG. 4 illustrates a process flow diagram for SRS bandwidth allocation configuration in accordance with at least one embodiment.

Referring now to FIG. 4, a process flow diagram 400 in accordance with some embodiments is now presented. In particular, the flow diagram 400 illustrates the interaction between a node B 110 and a UE 120. The UE 120 may receive RRC signaling 440, which is SRS configuration signaling. The UE 120 uses data from the RRC signaling 440 to create an uplink message 460 to the node B 110 including a SRS allocated as disclosed herein. The node B 110 may then respond with the UL scheduling grant signaled via DL 470, such as a PDCCH, in reply to the request by the UE 120 in the uplink message 460. In response to the UL scheduling grant in the UL message 460, the UE 120 may forward to the node B 110 UL data transmission 480 for which the link adaptation/scheduling decisions have been performed based on transmitted SRS.

Figure 2:
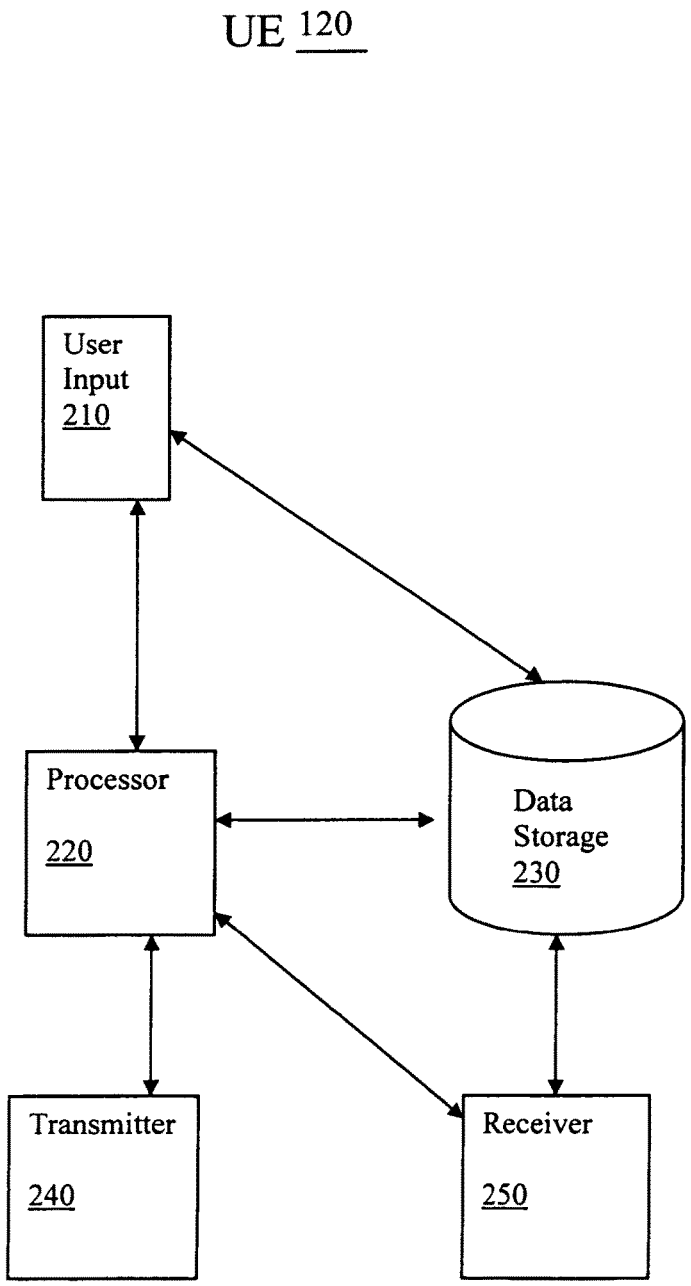
FIG. 2 is a high level schematic diagram of a user equipment in accordance with some embodiments.

Referring now to FIG. 2, a UE 120 in accordance with certain embodiments is now provided. The UE 120 includes a processor 210 configured to access stored data in a storage device 230 to form an uplink message that includes the SRS. The storage device 230 may store, for example, data related to the DM RS and SRS signals, a desired maximum cyclic shift separation, and details to support a tree-based band assignment. Similarly, the storage device 230 may store data as needed for the processor 220 to determine sufficient bandwidth to reserve for PUCCH and Persistent PUSCH and the corresponding desired DFT and RPF sizes for the SRS band and bandwidth allocation. This information stored in the storage 230 may be provided, for example, by a user interface 210 or is received from an outside source via a receiver 250. The processor 220 may then form the uplink message that includes the SRS on allocated band with allocated bandwidth and forward this uplink message to a transmitter 240 for transmission to an outside device, such as a node B.

As described above, the SRS transmission should not "puncture" the PUCCH region or otherwise attempt to transmit over a RB reserved for the PUCCH. Similarly, it is possible to configure the PUCCH bandwidth-parameter in such a way that the SRS is not overlapping with the (majority of) persistent PUSCH allocations. Accordingly, one embodiment relates to fulfilling this requirement that the SRS transmission should not puncture the PUCCH regions even in cases in which the PUCCH bandwidth (BW), including persistent PUSCH, varies dynamically.

Figure 10:
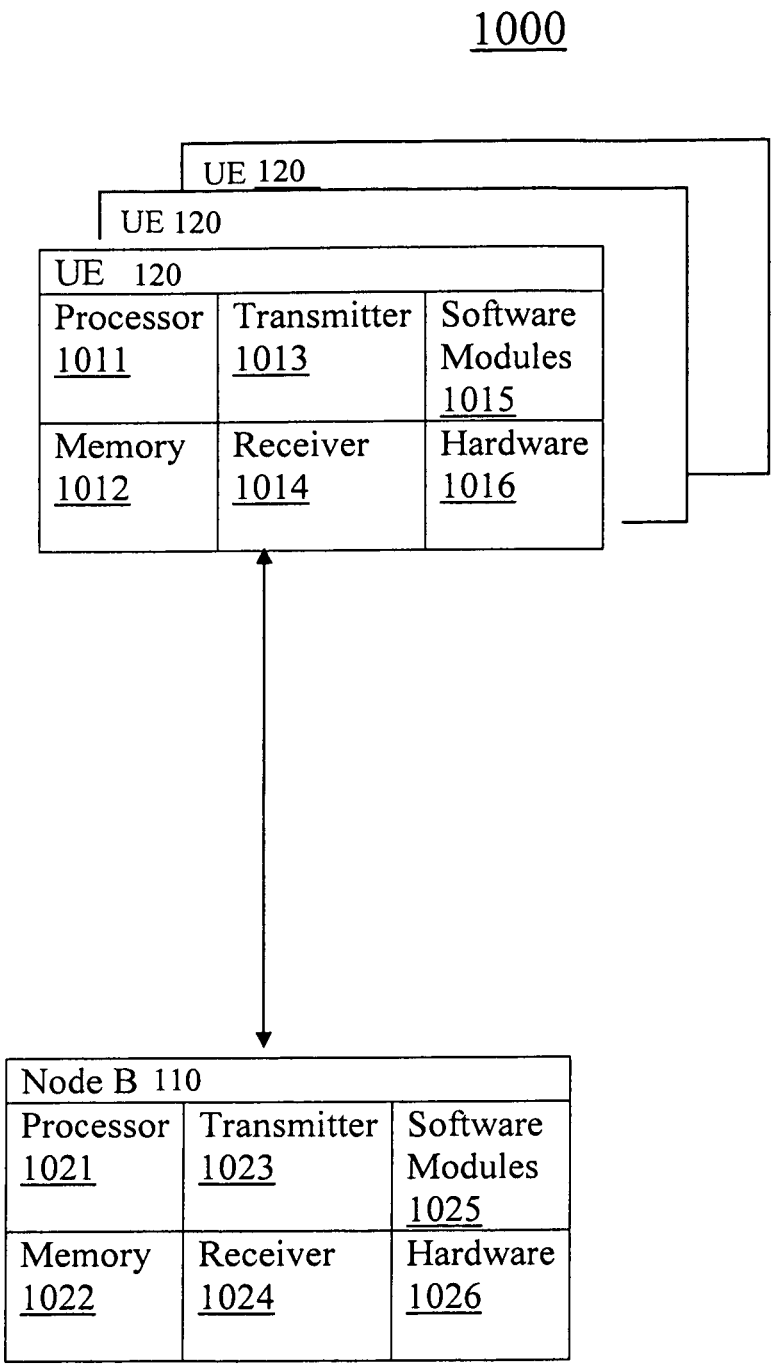
FIG. 10 is a high-level, schematic diagram that illustrates components of a cell system in accordance with some embodiments.

As depicted in FIG. 10, each of the UE 120 in a cell may include a processor 1011, memory 1012, and input and output devices 1013-1014. The source 1010 may further include software 1015 and related hardware 1016 to perform the functions related to forming and transmitting an appropriate SRS message, as disclosed in the some embodiments. For example, the source 120 may receive and store configuration criteria for the SRS to be transmitted, access the memory and form the SRS messages using the stored parameters, and then remove the stored parameters from memory after receiving confirmation that the transmitted SRS message was received by the base station 110. Thus, the processing of the SRS messages to be transmitted may be performed, as needed by circuitry in the hardware 1016 or software 1015.

Likewise, the Node B 110 may include a processor 1021, memory 1022, and input and output devices 1023-1024. The base station (e.g. node 110) may further include software 1025 and related hardware 1026 for performing the functions related to the receiving and decoding of the transmitted SRS signals, as disclosed in the present application. Also, the Node B 110 may include logic in the hardware 1026 or the software 1025 to form a configuration message defining the criteria for the SRS message for a particular node B 110 or for all of the node Bs 110 in a cell.

A computer program embodied on a computer-readable medium, a compute-readable medium encoded with a computer program, or similar language may be embodied as a tangible data storage device storing computer software programs configured to control a processor, digital processing device, central processing unit (CPU), or the like, to perform one or more operations or execute one or more software instructions. A tangible data storage device may be embodied as a volatile memory device or a nonvolatile memory device, and/or a combination of a volatile memory device and a nonvolatile memory device. Accordingly, some of the embodiments provide for a computer-readable medium encoded with a computer program, where the computer program is configured to perform operations.

It should be noted that reference throughout this specification to features, advantages, or similar language does not imply that all of the features and advantages that may be realized with the embodiments described above should be or are in any single embodiment. Rather, language referring to the features and advantages is understood to mean that a specific feature, advantage, or characteristic described in connection with an embodiment is included in at least one embodiment described above. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments.

The invention claimed is:

1. A method, comprising:

forming, by a [processor] *user equipment*, a frequency hopping position of [the] *a* sounding reference signal based on a hopping pattern;

configuring, *at the user equipment,* the hopping pattern of the sounding reference signal to utilize a tree assignment for a frequency allocation of the sounding reference signal and to support at least one frequency band branch per layer;

configuring, *at the user equipment,* the hopping pattern of the sounding reference signal to provide consecutive sounding reference signals on widely separated frequency allocations;

defining, *at the user equipment,* a frequency-domain starting position for a hopping sounding reference signal [based on a similar equation as the sounding reference signal without frequency hopping]; and defining, *at the user equipment,* the hopping pattern in terms of $n_l$ for tree layers 1 and above:

$n_l = F_{l,t} + n_{l,orig} \bmod N_l$, where $n_{l,orig}$ is a reference value of an allocation index for tree layer [1] $l$, where $N_l$ is a number of new branches per a branch on an assignment tree layer [1] $l$, where t is a time index for the sounding reference signal and is relative on a common reference frame and subframe number and is a function of the current frame number, the subframe number and a sounding reference signal period, $n_l$ is the sounding reference signal frequency position index on tree layer [1] $l$, and $F_{l,t}$ is a sounding reference signal position.

2. The method according to claim 1, further comprising: defining a frequency-domain starting position of $k_0$ by $$k_0 = k_0' + \sum_{l=0}^{L_{SRS}} B_l n_l,$$

where $k'_0$ is an offset in sub-carriers related to a used repetition factor comb, $L_{SRS}$ is the index of the assigned sounding reference signal bandwidth value, $B_l$ is the sounding reference signal bandwidth in subcarriers on tree layer [1, and $n_l$ is the sounding reference signal frequency position index on tree layer 1] $l$.

3. The method according to claim 1, further comprising: defining $F_{l,t}$ as $$F_{l,t} = N_l/2\left\lfloor \frac{t \bmod \prod_{l'=0}^{l} N_{l'}}{\prod_{l'=0}^{l-1} N_{l'}} \right\rfloor + \left\lfloor \frac{t \bmod \prod_{l'=0}^{l} N_{l'}}{2\prod_{l'=0}^{l-1} N_{l'}} \right\rfloor$$

when $N_l$ is even; and defining $F_{l,t}$ as $F_{l,t}=\lfloor N_l/2\rfloor\lfloor t/\Pi_{l'=0}^{l-1}N_{l'}\rfloor$ when $N_l$ is odd.

4. The method according to claim 1, further comprising: defining the frequency hopping of sounding reference signal only for tree layers [1] $l_{min}$ and above; and defining the hopping pattern in terms of $n_l$ for tree layers [1] $l_{min}$ and above:

$n_l=F_{l,t}+n_{l,orig} \bmod N_l$, where $n_{l,orig}$ is a reference value of an allocation index for tree layer [1] $l$, where $N_l$ is a number of new branches per a branch on an assignment tree layer [1] $l$, where t is a time index for the sounding reference signal and is relative on a common reference frame and subframe number and is a function of the current frame number, the subframe number and a sounding reference signal period.

5. The method according to claim 4, further comprising: defining $F_{l,t}$ as $F_{l,t}=0$ when [1] $l$<[1] $l_{min}$;

defining $F_{l,t}$ as $$F_{l,t} = N_l/2\left\lfloor \frac{t \bmod \prod_{l'=l_{min}-1}^{l} N_{l'}}{\prod_{l'=l_{min}-1}^{l-1} N_{l'}} \right\rfloor + \left\lfloor \frac{t \bmod \prod_{l'=l_{min}-1}^{l} N_{l'}}{2\prod_{l'=l_{min}-1}^{l-1} N_{l'}} \right\rfloor$$

when [1] $l$ is equal to or larger than [1] $l_{min}$ and when $N_l$ even; and defining $F_{l,t}$ as $$F_{l,t} = \lfloor N_l/2\rfloor\left\lfloor t \Big/ \prod_{l'=l_{min}-1}^{l-1} N_{l'} \right\rfloor$$

when [1] $l$ is equal to or larger than [1] $l_{min}$ and when $N_l$ odd, where $N_l$ is a number of new branches per a branch on an assignment tree layer [1] $l$, except for [1] $l_{min}-1$ for which $N_{l_{min}-1}=1$ regardless of the number of new branches on tree layer [1] $l_{min}-1$.

6. The method according to claim 1, further comprising: receiving a selection between [the] *a* frequency hopping and [the] *a* non-frequency hopping sounding reference signal, wherein the sounding reference signal is configured with the frequency hopping or without the frequency hopping, wherein the selection of the frequency hopping and the non-frequency hopping sounding reference signal is specific to a user equipment or to all user equipments within a cell.

7. The method according to claim 1, further comprising: receiving a radio resource control signal from an apparatus, the radio resource control signal is a sounding reference signal configuration signalling;

transmitting an uplink message to the apparatus including an allocated sounding reference signal based on data in the radio resource control signal.

[8. An apparatus, comprising: a processor configured to process frequency hopping position of the sounding reference signal based on a hopping pattern, wherein the hopping pattern of the sounding reference signal is configured to utilize a tree assignment for a frequency allocation of the sounding reference signal and to support at least one frequency band branch per layer, to provide consecutive sounding reference signals on widely separated frequency allocations, to define a frequency-domain starting position for a hopping sounding reference signal based on a similar equation as the sounding reference signal without frequency hopping, and to define the hopping pattern in terms of $n_l$ for tree layers 1 and above: $n_l=F_{l,t}+n_{l,orig} \bmod N_l$, where $n_{l,orig}$ is a reference value of an allocation index for tree layer l, where $N_l$ is a number of new branches per a branch on an assignment tree layer l, where t is a time index for the sounding reference signal and is relative on a common reference frame and subframe number and is a function of the current frame number, the subframe number and a sounding reference signal period, $n_l$ is the sounding reference signal frequency position index on tree layer l and $F_{l,t}$ is a sounding reference signal position.]

[9. The apparatus according to claim 8, wherein the processor is further configured to define a frequency-domain starting position of $k_0$ by $$k_0 = k'_0 + \sum_{l=0}^{L_{SRS}} B_l n_l,$$

where $k'_0$ is an offset in sub-carriers related to a used repetition factor comb, $L_{SRS}$ is the index of the assigned sounding reference signal bandwidth value, $B_l$ is the sounding reference signal bandwidth in subcarriers on tree layer l, and $n_l$ is the sounding reference signal frequency position index on tree layer l.]

[10. The apparatus according to claim 8, wherein the processor is further configured to define $F_{l,t}$ as $$F_{l,t} = N_l/2\left\lfloor \frac{t \bmod \prod_{l'=0}^{l} N_{l'}}{\prod_{l'=0}^{l-1} N_{l'}} \right\rfloor + \left\lfloor \frac{t \bmod \prod_{l'=0}^{l} N_{l'}}{2\prod_{l'=0}^{l-1} N_{l'}} \right\rfloor$$

when $N_l$ is even; and define $F_{l,t}$ as $F_{l,t}=\lfloor N_l/2\rfloor\lfloor t/\Pi_{l'=0}^{l-1}N_{l'}\rfloor$ when $N_l$ is odd.]

[11. The apparatus according to claim 8, wherein the processor is further configured to define the frequency hopping of sounding reference signal only for tree layers $l_{min}$ and above; and define the hopping pattern in terms of $n_l$ for tree layers $l_{min}$ and above:

$n_l = F_{l,t}\, n_{l,orig} \bmod N_l$, where $n_{l,orig}$ is a reference value of an allocation index for tree layer l, where $N_l$ is a number of new branches per a branch on an assignment tree layer l, where t is a time index for the sounding reference signal and is relative on a common reference frame and subframe number and is a function of the current frame number, the subframe number and a sounding reference signal period.]

[12. The apparatus according to claim 11, wherein the processor is further configured to define $F_{l,t}$ as $F_{l,t}=0$ when $l<l_{min}$;

define $F_{l,t}$ as $$F_{l,t} = N_l/2\left\lfloor \frac{t \bmod \prod_{l'=l_{min}-1}^{l} N_{l'}}{\prod_{l'=l_{min}-1}^{l-1} N_{l'}} \right\rfloor + \left\lfloor \frac{t \bmod \prod_{l'=l_{min}-1}^{l} N_{l'}}{2\prod_{l'=l_{min}-1}^{l-1} N_{l'}} \right\rfloor$$

when l is equal to or larger than $l_{min}$ and when $N_l$ even; and define as $F_{l,t}$ as $F_{l,t}=\lfloor N_l/2 \rfloor \lfloor t/\Pi_{l'=l_{min}-1}^{l-1} N_{l'} \rfloor$ when l is equal to or larger than $l_{min}$ and when $N_l$ odd, where $N_l$ is a number of new branches per a branch on an assignment tree layer l, except for $l_{min}-1$ for which $N_{l_{min}-1}=1$ regardless of the number of new branches on tree layer $l_{min}-1$.]

[13. The apparatus according to claim 8, further comprising:

a receiver configured to receive a selection between the frequency hopping and the non-frequency hopping sounding reference signal, wherein the sounding reference signal is configured with the frequency hopping or without the frequency hopping, wherein the selection of the frequency hopping and the non-frequency hopping sounding reference signal is specific to a user equipment or to all user equipments within a cell.]

[14. The apparatus according to claim 8, further comprising:

a receiver configured to receive a receiving a radio resource control signal from another apparatus, the radio resource control signal is a sounding reference signal configuration signalling;

a transmitter configured to transmit an uplink message to the other apparatus including an allocated sounding reference signal based on data in the radio resource control signal.]

15. A non-transitory computer-readable medium including a computer program, wherein the computer program is configured to control a processor to perform a method, comprising:

forming a frequency hopping position of [the] *a* sounding reference signal based on a hopping pattern;

configuring the hopping pattern of the sounding reference signal to utilize a tree assignment for a frequency allocation of the sounding reference signal and to support at least one frequency band branch per layer;

configuring the hopping pattern of the sounding reference signal to provide consecutive sounding reference signals on widely separated frequency allocations;

defining a frequency-domain starting position for a hopping sounding reference signal [based on a similar equation as the sounding reference signal without frequency hopping]; and defining the hopping pattern in terms of $n_l$ for tree layers 1 and above:

$n_l = F_{l,t} + n_{l,orig} \bmod N_l$, where $n_{l,orig}$ is a reference value of an allocation index for tree layer [1] *l*, where $N_l$ is a number of new branches per a branch on an assignment tree layer [1] *l*, where t is a time index for the sounding reference signal and is relative on a common reference frame and subframe number and is a function of the current frame number, the subframe number and a sounding reference signal period, [$n_1$] $n_l$ is the sounding reference signal frequency position index on tree layer [1] *l* and $F_{l,t}$ is a sounding reference signal position.

[16. An apparatus, comprising: forming means for forming a frequency hopping position of the sounding reference signal based on a hopping pattern; configuring means for configuring the hopping pattern of the sounding reference signal to utilize a tree assignment for a frequency allocation of the sounding reference signal, to support at least one frequency band branch per layer, and to provide consecutive sounding reference signals on widely separated frequency allocations; defining means for defining a frequency-domain starting position for a hopping sounding reference signal based on a similar equation as the sounding reference signal without frequency hopping and for defining the hopping pattern in terms of $n_l$ for tree layers 1 and above: $n_1 = F_{l,t} + n_{l,orig} \bmod N_l$, where $n_{l,orig}$ is a reference value of an allocation index for tree layer l, where $N_l$ is a number of new branches per a branch on an assignment tree layer l, where t is a time index for the sounding reference signal and is relative on a common reference frame and subframe number and is a function of the current frame number, the subframe number and a sounding reference signal period, $n_l$ is the sounding reference signal frequency position index on tree layer l and $F_{l,t}$ is a sounding reference signal position.]

17. A method, comprising:

forming, by a [processor] *user equipment*, a frequency hopping position of [the] *a* sounding reference signal based on a hopping pattern;

configuring, *at the user equipment,* the hopping pattern of the sounding reference signal to utilize a tree assignment for a frequency allocation of the sounding reference signal and to support at least one frequency band branch per layer;

configuring, *at the user equipment,* the hopping pattern of the sounding reference signal to provide consecutive sounding reference signals on widely separated frequency allocations;

defining, *at the user equipment,* a frequency-domain starting position for a hopping sounding reference signal [based on a similar equation as the sounding reference signal without frequency hopping];

defining, *at the user equipment,* the hopping pattern in terms of $n_l$ for tree layers 1 and above:

$n_l = F_{l,t} + n_{l,orig} \bmod N_l$, where $n_{l,orig}$ is a reference value of an allocation index for tree layer [1] *l*, where $N_l$ is a number of new branches per a branch on an assignment tree layer [1] *l*, where t is a time index for the sounding reference signal and is relative on a common reference frame and subframe number and is a function of the current frame number, the subframe number and a sounding reference signal period, $n_l$ is the sounding reference signal frequency position index on tree layer [1] $l$, and $F_{l,t}$ is a sounding reference signal position;

receiving, *at the user equipment,* a radio resource control signal from an apparatus, the radio resource control signal is a sounding reference signal configuration signalling; and transmitting, *at the user equipment,* an uplink message to the apparatus including an allocated sounding reference signal based on data in the radio resource control signal.

[18. An apparatus, comprising: a processor configured to process frequency hopping position of the sounding reference signal based on a hopping pattern, wherein the hopping pattern of the sounding reference signal is configured to utilize a tree assignment for a frequency allocation of the sounding reference signal and to support at least one frequency band branch per layer, to provide consecutive sounding reference signals on widely separated frequency allocations, to define a frequency-domain starting position for a hopping sounding reference signal based on a similar equation as the sounding reference signal without frequency hopping, and to define the hopping pattern in terms of $n_l$ for tree layers 1 and above: $n_1=F_{1,t}+n_{l,orig} \bmod N_l$, where $n_{l,orig}$ is a reference value of an allocation index for tree layer l, where $N_l$ is a number of new branches per a branch on an assignment tree layer l, where t is a time index for the sounding reference signal and is relative on a common reference frame and subframe number and is a function of the current frame number, the subframe number and a sounding reference signal period, $n_l$ is the sounding reference signal frequency position index on tree layer l, and $F_{l,t}$ is a sounding reference signal position; a receiver configured to receive a receiving a radio resource control signal from another apparatus, the radio resource control signal is a sounding reference signal configuration signalling; and a transmitter configured to transmit an uplink message to the other apparatus including an allocated sounding reference signal based on data in the radio resource control signal.]

* * * * *